US 6,601,372 B1

(12) United States Patent
Heinsey et al.

(10) Patent No.: US 6,601,372 B1
(45) Date of Patent: Aug. 5, 2003

(54) STONE DETECTION METHOD AND APPARATUS FOR HARVESTER

(75) Inventors: David N. Heinsey, Stevens, PA (US); Richard P. Strosser, Akron, PA (US); John G. Berger, Landisville, PA (US); Michael J. Digman, Denver, PA (US)

(73) Assignee: New Holland North America, Inc., New Holland, PA (US)

( * ) Notice: Subject to any disclaimer, the term of this patent is extended or adjusted under 35 U.S.C. 154(b) by 24 days.

(21) Appl. No.: 10/079,407

(22) Filed: Feb. 22, 2002

(51) Int. Cl.⁷ .............................................. A01D 75/28
(52) U.S. Cl. .................................................... 56/10.2 J
(58) Field of Search .................... 460/1, 2, 3; 56/10.2 J, 56/10.2 R; 701/50

(56) References Cited

U.S. PATENT DOCUMENTS

| | | |
|---|---|---|
| 3,675,660 A | 7/1972 | Girodat |
| 4,212,398 A * | 7/1980 | Parker et al. ................ 209/590 |
| 4,275,546 A | 6/1981 | Bohman et al. |
| 4,294,062 A | 10/1981 | Seymour |
| 4,353,199 A * | 10/1982 | Chow et al. .................... 460/2 |
| 4,625,872 A * | 12/1986 | DeLacy et al. ............. 209/557 |
| 4,666,046 A * | 5/1987 | Manzer ....................... 209/599 |
| 4,720,962 A | 1/1988 | Klinner |
| 5,070,682 A * | 12/1991 | Bohman .................... 56/10.2 J |
| 5,078,645 A * | 1/1992 | Bohman et al. ................ 460/2 |
| 5,082,118 A * | 1/1992 | Rintala et al. .............. 209/599 |
| 5,444,966 A * | 8/1995 | Strosser et al. ........... 56/10.2 J |
| 6,044,632 A * | 4/2000 | Schmalz et al. ......... 56/10.2 R |
| 6,116,008 A | 9/2000 | Digman et al. |
| 6,269,618 B1 | 8/2001 | Digman et al. |
| 6,298,641 B1 | 10/2001 | Digman et al. |
| 6,312,329 B1 | 11/2001 | Digman et al. |

* cited by examiner

Primary Examiner—Robert E. Pezzuto
Assistant Examiner—Alicia Torres
(74) Attorney, Agent, or Firm—John William Stader; Rebecca L. Henkel

(57) ABSTRACT

An agricultural harvester having a header with a reel and an auger, wherein the reel and the auger provide crop material to an elevator and a foreign object detecting mechanism, wherein the foreign object detecting mechanism includes a foreign object detecting circuit for detecting foreign objects and an object extrusion mechanism operationally connected to be activated by the detecting circuit. The detecting circuit includes a first vibration sensor, a programmable amplifier, a frequency bandpass filter, a variable threshold comparator, and a microprocessor including a pulse rejection network. The microprocessor is electronically connected to control the threshold comparator and the programmable amplifier, and activates the object extrusion mechanism when the pulse rejection network generates an internal signal.

7 Claims, 3 Drawing Sheets

STONE DETECTION METHOD AND APPARATUS FOR HARVESTER

FIELD OF THE INVENTION

The present invention pertains to a stone detection method and apparatus for detecting and removing discrete hard foreign objects from mobile agricultural equipment. Specifically, self-propelled combine harvesters and forage harvesters are adapted with an apparatus that performs the method of detection of rocks and other discrete hard objects to permit the reliable removal of rocks and foreign objects from harvested crop material during crop harvesting operations.

BACKGROUND OF THE INVENTION

In the art of mechanically harvesting crops, it is known that self-propelled agricultural vehicles, such as combine harvesters and forage harvesters, are used to mechanically harvest crops. Typically, these vehicles are equipped with a harvesting implement, or header, that includes a reel for pulling crops into an array of blades for cutting the crop, wherein the cut crop material is pulled farther into the header by an auger. Once past the auger, the cut crop material is carried by an elevator to a threshing and sorting mechanism that removes unwanted chaff material from the desired crop matter before the crop matter reaches a storage compartment carried by the vehicle. However, this simple crop harvesting process is complicated by the fact that stones and other discrete hard objects are often pulled into the header with the crops. In the context of this disclosure, the terms "stones," "rocks," "objects," and "hard materials" are used interchangeably and define equivalent matter to include any discrete undesirable matter such as stones, rocks, pieces of metal, and pieces of wood, that is separable from the cut crop material (i.e., harvested crop plant material). Unfortunately, stones and other hard debris can cause expensive damage to the elevator and threshing mechanisms; therefore, various methods and apparatuses have been developed to detect and remove stones and other potentially damaging foreign objects from the header before the cut crop material is carried by the elevator into the threshing and sorting mechanism.

Typically, the stone detection methods and apparatuses of the prior art include a stone detection circuit that operates a mechanism for removing any stones or hard objects. For example, U.S. Pat. No. 3,675,660 to Girodat, which is incorporated herein by reference in its entirety, discloses a rock detection circuit that includes a rock detector, a bandpass filter, a peak signal detector, an amplifier, and a solenoid operated trap door placed along the cut crop path before the crop elevator. The rock detector is a piezoelectric ceramic disc that picks up vibrations as the crop material passes and sends a sensing signal to the bandpass filter. Rocks are known to generate higher frequency vibrations than the crop material, so the bandpass filter removes low frequency signals from the sensing signal before sending the filtered signal to the peak signal detector. The peak signal detector generates a signal only if the filtered signal has an amplitude greater than a predetermined amplitude ("threshold amplitude"), thereby filtering out background noise signals. When the filtered signal exceeds the predetermined amplitude, the peak signal detector generates a signal that is amplified by an amplifier, which sends an activating signal to a solenoid, which operates to open the trap door so that the hard foreign object will fall out of the header. Unfortunately, there is a lot of background noise due to vibrations generated by the vehicle's engine, jarring of the vehicle as it travels along the ground, and rock impacts on the exterior of the header during harvesting operations. Consequently, unless sensitivity of the rock detection circuit is precisely set, either the trap door will open unnecessarily thereby spilling valuable crop on the ground or the trap door will not open when needed so that many large stones will reach the elevator and threshing mechanism resulting in damage to the vehicle. It is noted that Girodat's rock detection circuit has no control components for adjusting the frequency sensitivity of the bandpass filter, or the threshold amplitude of the peak signal detector.

In an attempt to mitigate the effect of background vibrations, U.S. Pat. No. 4,275,546 to Bohman et al. discloses a stone discriminator circuit that uses a pair of piezoelectric crystals that are vibrationally isolated from the header and the harvester by two vibration isolators. The two piezoelectric crystals are set to detect different vibration frequencies, one crystal detects vibration generated by the crop material and the other crystal detects vibration generated by stones. Each crystal sends signals to its respective bandpass filter, then to a difference amplifier that receives input from both bandpass filters. The difference amplifier detects the difference between the signals from the two crystals and outputs an amplified signal to a threshold circuit. The threshold circuit generates a signal to operate a trap door or an alarm only if the amplified signal from the difference signal exceeds a threshold amplitude. In other words, the two crystals provide comparative information with respect to the background vibrations and superimposed rock vibrations in an attempt to weed out the background events from stone impact events near the crystals. However, Bohman's circuit also has the drawback that the stone discriminator circuit has no control components for adjusting the frequency sensitivity of the bandpass filters, or the threshold amplitude of the threshold circuit.

Lastly, U.S. Pat. No. 4,720,962 to Klinner discloses a means for detecting stones and metal, which is a circuit including a vibration detector and a metal detector for detecting unwanted objects in a forage harvester. The vibration detecting portion of the circuit includes a vibration sensor, a high pass filter and a comparator, so that a vibration detecting signal is generated that is frequency filtered and that represents an event exceeding a minimum threshold amplitude. Input from a metal sensor and input from the vibration detecting portion feed into the remaining portion of the stone and metal detection circuit to activate a door system to get rid of the unwanted object. It is noted that the stone and metal detection circuit includes a timing circuit so that the door system stays open for only a predetermined period of time. However, Klinner's stone and metal detection circuit has no control components for adjusting the frequency sensitivity of the bandpass filters, or the threshold amplitude of the threshold circuit.

Therefore, the present invention endeavors to provide an improved method for detecting and removing hard objects from cut crop material during crop harvesting with a mechanical harvester, and an apparatus for performing this method that reliably produces cut crop material that is essentially solely cut crop matter that is an improvement over the prior art devices and methods.

Accordingly, a primary object of the present invention is to overcome the disadvantages of the prior art methods and apparatuses for detecting and removing hard objects from cut crop material during crop harvesting with a mechanical harvester.

Another object of the present invention is to provide a method and apparatus for detecting and removing hard foreign objects from cut crop material that achieves adequate detection rates for the hard foreign objects, so that the objects can be reliably removed.

Another object of the present invention is to provide a method and apparatus for detecting and removing hard foreign objects from cut crop material that allows for external adjustment of various detection parameters by an operator to achieve the improved detection rates for the hard foreign objects.

Another object of the present invention is to provide a method and apparatus for detecting and removing hard foreign objects from cut crop material that allows for the system to internally adjust to various internal and/or external influences that are transparent to the operator to achieve the improved detection rates for the hard foreign objects.

SUMMARY OF THE INVENTION

In accordance with the present invention, there is provided a method for detecting and removing hard objects from a cut crop material that is not limited to any one particular apparatus, or combination of apparatuses, for performing the method. The method comprises the steps of (a) providing a cut crop material that includes foreign hard objects in addition to cut crop matter; (b) sensing the cut crop material and foreign hard objects using a sensor to generate a signal; (c) amplifying the signal, wherein the magnitude of amplification is controlled by the microprocessor; (d) processing the signal to filter a bandwidth to generate a bandwidth filtered signal, optionally wherein a microprocessor controls the frequency range of the filtered bandwidths; (e) processing the bandwidth filtered signal to generate an amplitude threshold signal when the bandwidth filtered signal exceeds a minimum threshold amplitude, wherein the microprocessor controls a value of the minimum threshold amplitude; (f) processing the amplitude threshold signal to generate an internal signal only when the amplitude threshold signal has a pulse width that exceeds a minimum pulse width value, thereby eliminating noise signals; and (g) determining that a hard object is present based upon the internal signal, then removing the hard object based upon an output signal by using a hard object removal mechanism to produce a cut crop material that is essentially cut crop matter.

The present invention also provides an agricultural harvester having a header with a reel and an auger, wherein the reel and the auger provide crop material to an elevator and a foreign object detecting mechanism, wherein the foreign object detecting mechanism includes a foreign object detecting circuit to detect foreign objects and an object extrusion mechanism operationally connected to be activated by the detecting circuit, wherein the detecting circuit is connected to a power supply and comprises (a) a first vibration sensor that generates a first input signal in response to vibrations generated by a foreign object; (b) a programmable amplifier that receives the first input signal and generates an amplified first output signal; (c) a frequency bandpass filter that receives and filters a bandwidth of the first output signal to generate a first frequency filtered signal; (d) a variable threshold comparator that receives the first frequency filtered signal and generates a second output signal when the first frequency filtered signal exceeds a minimum threshold amplitude; (e) a pulse rejection network that deceives the second output signal and generates an internal signal when a frequency calculated from the pulse train of the second output signal corresponds to a specified frequency bandwidth; and (f) a microprocessor that includes the pulse rejection network and that is electronically connected to the threshold comparator and to the programmable amplifier, wherein the microprocessor operates to control the value of the minimum threshold amplitude of the threshold comparator and to control the magnitude of signal amplification performed by the programmable amplifier, wherein the detecting circuit activates the object extrusion mechanism whenever the detecting circuit generates a third output signal.

Further objects, features and advantages of the invention will become apparent from the Detailed Description of Preferred Embodiments that follows, when considered together with the attached drawings.

DETAILED DESCRIPTION OF THE INVENTION

The present invention generally includes a method for detecting and removing hard objects from a cut crop material, and an agricultural harvester for performing the method. To facilitate an easy understanding of the present invention, the agricultural harvester will be described first, with reference to the Figures.

Figure 1:
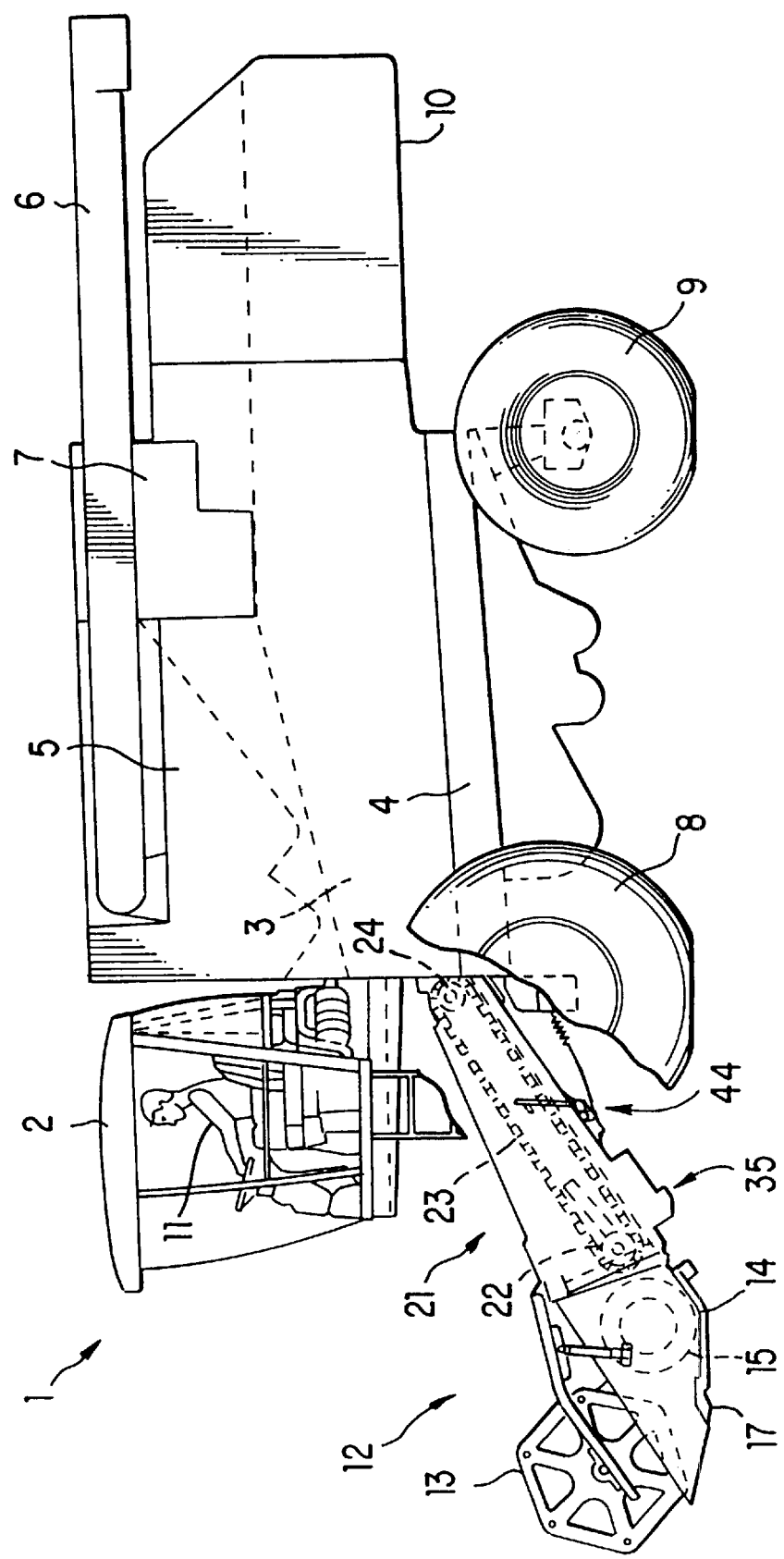
FIG. 1 is an agricultural harvester in accordance with a preferred embodiment of the present invention.

Referring to FIG. 1, an agricultural harvester 1 is typically a self-propelled vehicle having two wheel pairs 8 and 9, engine 7 mechanically connected to rotate the wheels, cab 2 where the vehicle operator 11 sits, and a header 12 for harvesting crops. Header 12 includes reel assembly 13 for pulling crops into the header so that the crops are cut by blade assembly 17 in the conventional manner, and auger 15 situated in auger trough 14 for pushing cut crop material into the center of the header. As is conventionally known, the header 12 and the reel assembly 13 have position adjusting mechanisms (not shown) for moving and positioning the header and the reel assembly relative to the crops and the ground so that crops can be optimally harvested. A cut crop elevator 21, or "feederhouse," is located at the center of the header 12 and is fed by the rotation of auger 15. Cut crop material moves from auger 15 to elevator 21 where the cut crop material is carried by an elevator apron 23 from a front drum 22 to a rear drum 24 and into the rearward portions of the harvester 1. Specifically, harvester 1 includes a threshing mechanism 3 and a grain/chaff separation system 4. Once the grain or other crop has been threshed and the chaff removed, the product crop is stored in tank 5. Tube 6 is used to unload the product crop and any chaff is discarded by the chaff spreader 10.

To protect the elevator 21, threshing mechanism 3, and other systems of the harvester 1 from damage due to stones, rocks, metal pieces, and any other discrete foreign hard objects that are mixed in with the crop matter, the elevator 21 is fitted with a hard object detector 35.

Figure 2:
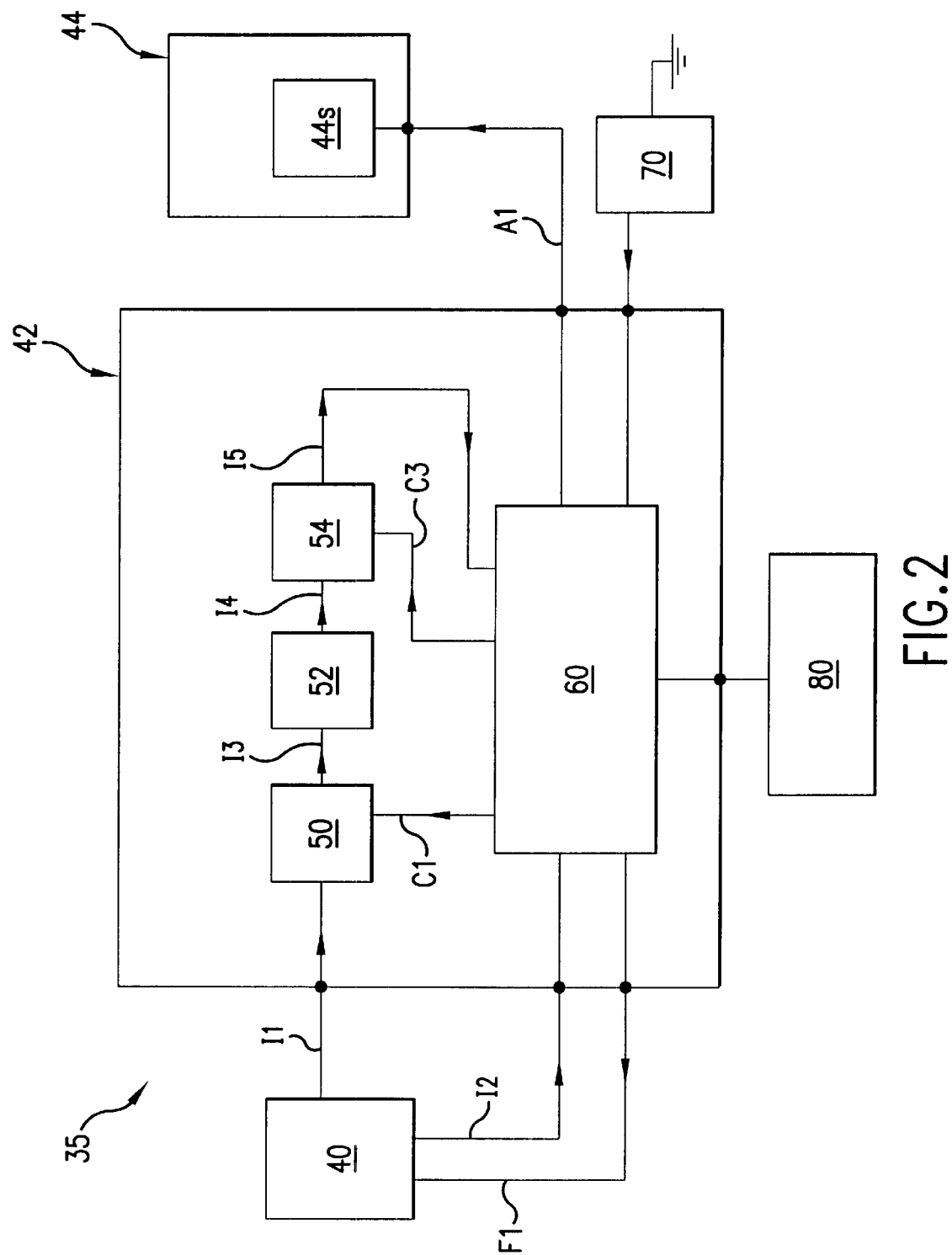
FIG. 2 is a schematic drawing of the apparatus in accordance with a preferred embodiment of the present invention.

The hard object detector 35 serves to both detect and to remove any foreign hard objects from the flow of cut crop material passing through the elevator 21, thereby producing a flow of cut crop matter that is essentially free of foreign hard objects. As schematically shown in FIG. 2, the hard object detector 35 includes a sensor 40, an electrical detection circuit 42 operationally connected to sensor 40 and to a power supply 70, and a hard object removal mechanism 44 operationally connected to and controlled by detection circuit 42.

Preferably, sensor 40 is preferably an acoustic sensor, although the invention is not limited to acoustic sensors. Furthermore, the invention can be practiced using a sensor array, so that sensor 40 could actually be an array of two or several sensor devices.

Detection circuit 42 includes programmable amplifier 50, variable bandpass filter 52, variable threshold comparator 54, and microprocessor 60 that includes a pulse rejection network. Power supply 70 is electrically connected to the detection circuit to provide power to run the system.

The details of detection circuit 42 are described below. Sensor 40 is electrically connected to provide an object sensing input signal I1 to the programmable amplifier 50 of circuit 42. Sensor 40 also provides an input signal I2 to microprocessor 60 in response to a feedback signal F1 from microprocessor 60. This feedback loop between sensor 40 and microprocessor 60 gives the microprocessor the ability to monitor the operation (i.e., activation status or sensitivity) of the sensor 40. In other words, signals I2 and F1 provide a self-diagnostic feedback loop between the sensor 40 and the microprocessor 60, thereby providing the microprocessor 60 with the capability to monitor the signal levels of sensor 40 and to determine fault conditions for the input transducer of sensor 40 and other input sub-systems in conjunction with the current state of the harvester 1 (i.e., whether the reel assembly running/reel assembly is or is not running).

Amplifier 50 is electrically connected to sensor 40, bandwidth filter 52, and microprocessor 60, and amplifies input signal I1 to produce signal I3 that is inputted into bandpass filter 52. The magnitude of amplification performed by amplifier 50 on signal I1 is controlled by microprocessor 60, which sends a control signal C1 to control the degree to which amplifier 50 amplifies, either positively or negatively, the magnitude of signal I1. In this manner, the microprocessor can adapt the amplifier 50 to varying internal and/or external influences on signal strength over a broader range of amplitudes.

Bandpass filter 52 is electrically connected to amplifier 50, comparator 54, and microcomputer 60, and receives and filters signal I3 to produce a frequency filtered signal I4 corresponding to a predetermined and preferred frequency bandwidth. In other words, bandpass filter 52 generally filters out low frequency signals such as would be generated by soft organic crop material passing through feederhouse 21 but transmits high frequency signals such as would be generated by hard objects to be separated from the desired crop matter. Preferably, bandwidth filter 52 is a hardware-fixed bandwidth filter because such filters are relatively inexpensive. In an alternative embodiment, bandwidth filter 52 can be a variable bandwidth filter that is electrically connected to receive an input control signal directly from microprocessor 60. In this case, the frequency bandwidth filtered by bandwidth filter 52 is controlled by microprocessor 60, which sends the input control signal to set the bandwidth filtered by filter 52; therefore, filter 52 would be tunable by microprocessor 60 to adapt to varying internal and/or external influences on signal spectral content, theoretically improving the signal-to-noise ratio. In practice, however, it has been found that using an inexpensive fixed bandwidth filter provides a suitable degree of bandwidth filtering when used as bandwidth filter 52 and that utilizing the more expensive variable bandwidth filters do not significantly improve the operation of the hard object detector 35.

Variable threshold comparator 54 is electrically connected to filter 52 and to a pulse rejection network of microprocessor 60. Comparator 54 receives signal I4 from filter 52 and generates signal I5 only when the magnitude of signal I4 exceeds a minimum threshold amplitude. Comparator 54 also receives a control signal C3 from microprocessor 60, which sets the voltage value of the minimum threshold amplitude. In this manner, microprocessor 60 provides comparator 54 with the ability to adapt to varying internal and/or external influences on signal strength.

Microprocessor 60 is electrically connected to comparator 54 and receives signal I5 from comparator 54. More specifically, microprocessor 60 includes a pulse rejection network that receives signal I5 and generates an internal signal when the pulse train of signal I5 falls within a specified bandwidth frequency. Generally, the pulse rejection network includes a calculation circuit for calculating the frequency of the pulse train of signal I5, then this calculated frequency is inputted into a fixed bandpass filter that is also a part of the pulse rejection network of microprocessor 60. In this manner, the pulse rejection network excludes "glitches," that is, spurious signals failing to meet a specified pulse train frequency requirement, thereby minimizing false detections.

When the pulse rejection network generates the internal signal, microprocessor 60 subsequently utilizes the internal signal to generate activating signal A1 that is transmitted from the microprocessor to activate a solenoid 44s of hard object removal mechanism 44 that is electrically connected to microprocessor 60. As will be appreciated by one skilled in the art, the internal signal ultimately generated by the pulse rejection network is the product of amplifying, frequency bandwidth filtering, threshold amplitude comparing, and pulse train frequency exclusion of initial signal I1. As will also be appreciated by one skilled in the art, microprocessor 60 can be preprogrammed to generate control signals C1 and C3, and feedback signal F1, or the microprocessor can be operationally connected to receive signals from a control panel 80 preferably located in cab 2 for operator 11 to manipulate so that the operator has the ability to adjust the operation of sensor 40 and circuit 42.

Preferably, hard object removal mechanism 44 is broadly conceived to include any electromechanical mechanism for removing the hard objects from the flow of crop material and is not limited to any one particular mechanism. One example of a suitable hard object removal system for removing the hard objects from the crop material flow is disclosed in U.S. Pat. No. 6,298,641 B1 to Digman et al., which is incorporated herein by reference in its entirety. In this specific embodiment of the present invention, the hard object removal mechanism 44 includes an aperture in the floor of the housing of elevator 21. The flow of cut crop material passes over this aperture and remains in the elevator 21 because a trap door covers the aperture, thereby substantially blocking the aperture and preventing the flow of cut crop material from passing out of the elevator through the aperture and onto the ground. A solenoid 44s operated by the microprocessor 60 is activated whenever a foreign object is detected in the flow of cut crop material by the detection circuit 42, which generates a solenoid activating output signal A1. The solenoid is operationally connected to activate a door opening mechanism that subsequently opens the trap door in response to the solenoid activating output signal. Once the trap door is open, the aperture is no longer covered and gravity causes the crop material flow to exit the elevator 21 through the aperture. In addition, a sled can be used to help divert the crop flow towards the aperture. In this manner, those portions of the cut crop material flow containing the undesirable hard object or objects is selectively discharged (removed) to the ground. The trap door remains open only for a brief predetermined time period before the solenoid 44s is deactivated by the microprocessor 60 and a door closing mechanism, such as a door closing cable and latch, automatically closes the trap door. It is stressed, however, that the present invention can be practiced using other electromechanical mechanisms for removing hard objects from the flow of crop material.

Figure 3:
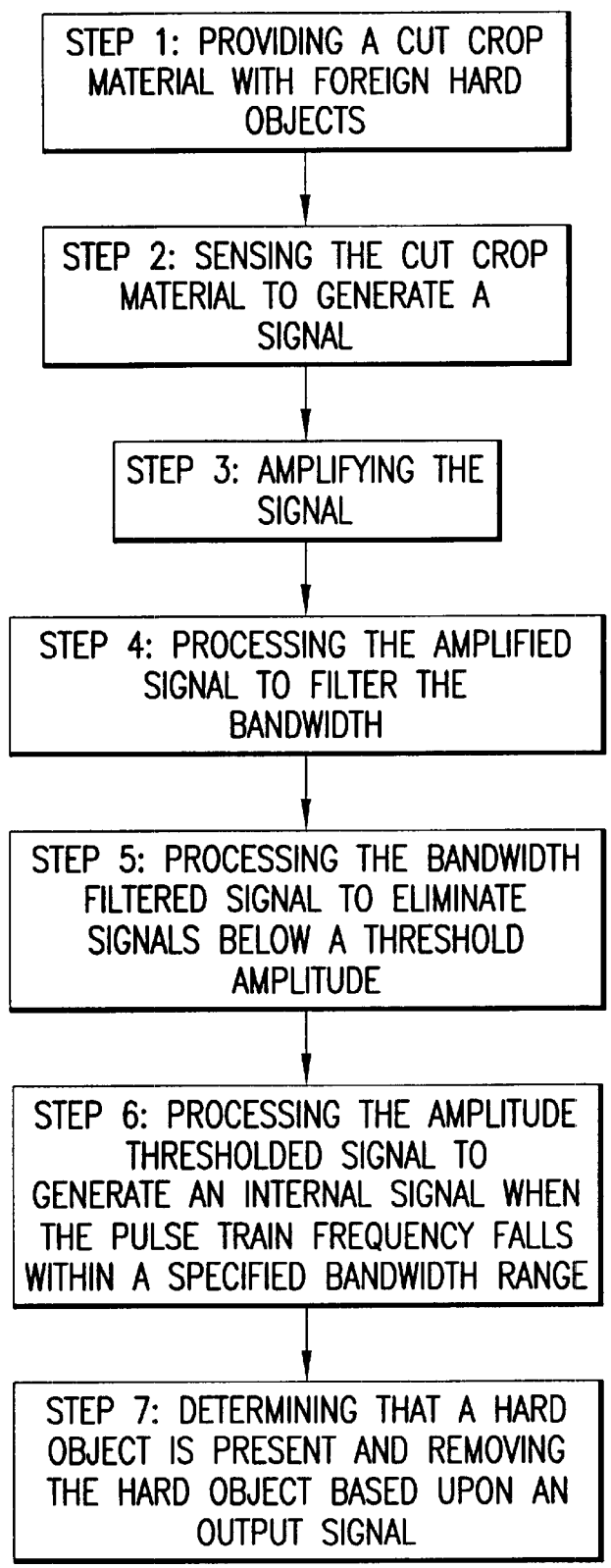
FIG. 3 is a flow diagram according to the preferred embodiment of the invention directed to the method for detecting and removing hard objects from a cut crop material.

Having fully described the apparatus in accordance with the present invention, the method for detecting and removing hard objects, such as stones and the like, from a cut crop material in accordance with the present invention will be described. FIG. 3 outlines the method of the present invention.

First, a cut crop material that includes foreign hard objects in addition to cut crop matter is provided when the header 12 is activated to cut crops. Second, a sensor 40 senses the cut crop material and the foreign hard objects therein and generates a signal. Third, the signal is amplified by an amplifier 50, wherein the magnitude of amplification is controlled by microprocessor 60. Fourth, the amplified signal is processed by a bandwidth filter 52 to filter the bandwidth of the amplified signal to generate a bandwidth filtered signal, wherein optionally microprocessor 60 controls the frequency range of the filtered bandwidths. Fifth, the bandwidth filtered signal is processed by a variable voltage threshold comparator 54 to generate an amplitude thresholded signal when the bandwidth filtered signal exceeds a minimum threshold amplitude, wherein microprocessor 60 controls the value of the minimum threshold voltage amplitude. Sixth, the amplitude thresholded signal is processed by a pulse rejection network of the microprocessor 60 to generate an internal signal only when the amplitude thresholded signal has a pulse train frequency that falls within a specified bandwidth frequency value, thereby eliminating noise signals. The seventh step is determining that a hard object is present based upon the internal signal, which is generally performed by microprocessor 60, then removing the hard object using a hard object removal mechanism 44 to produce a cut crop material that is essentially cut crop matter. In the seventh step, microprocessor 60 determines that a hard object is present based upon the internal signal from the pulse rejection network and transmits an activation signal to a solenoid 44s of removal mechanism 44, thereby setting the removal mechanism 44 into action to remove the hard object.

As will be appreciated by one skilled in the art, the sequence of steps in the method for detecting and removing hard objects from a cut crop in accordance with the present invention is not limited to the particular listed step sequence. Plainly, the first and seventh steps must remain as the first and last steps of the method; however, some steps such as the bandwidth filtering step and the amplitude thresholding step can be interchanged without departing from the scope and spirit of the method.

While the present invention has been described with reference to certain preferred embodiments, one of ordinary skill in the art will recognize that additions, deletions, substitutions, modifications and improvements can be made while remaining within the spirit and scope of the present invention as defined by the appended claims.

We claim:

1. An agricultural harvester having a header with a reel and an auger, wherein the reel and the auger provide crop material to an elevator and a foreign object detecting mechanism, wherein the foreign object detecting mechanism includes a foreign object detecting circuit for detecting foreign objects and an object extrusion mechanism operationally connected to be activated by the detecting circuit, wherein the detecting circuit comprises:

a first vibration sensor that generates a first signal in response to vibrations generated by a foreign object;

a programmable amplifier that receives the first signal and generates an amplified first output signal;

a frequency bandpass filter that receives and filters a bandwidth of the first output signal to generate a first frequency filtered signal;

a variable threshold comparator that receives the first frequency filtered signal and generates a second output signal when the first frequency filtered signal exceeds a minimum threshold amplitude;

a pulse rejection network that receives the second output signal and generates an internal signal when the pulse train frequency of the second output signal falls within a specified bandwidth frequency range; and a microprocessor that includes the pulse rejection network and that is electronically connected to the threshold comparator and to the programmable amplifier, wherein the microprocessor operates to control the value of the minimum threshold amplitude of the threshold comparator and to control the magnitude of signal amplification performed by the programmable amplifier, wherein the detecting circuit activates the object extrusion mechanism whenever the microprocessor generates a third output signal in response to the internal signal.

2. An agricultural harvester according to claim 1, wherein the first vibration sensor is a sensor array.

3. An agricultural harvester according to claim 1, wherein the microprocessor and the first vibration sensor share a direct electrical connection so that the microprocessor receives an input signal directly from the sensor and the sensor receives a feedback signal directly from the microprocessor.

4. An agricultural harvester according to claim 3, wherein the microprocessor monitors the operation of the sensor.

5. A method for detecting and removing hard objects from a cut crop material, the method comprising the steps of:

providing a cut crop material that includes foreign hard objects in addition to cut crop matter;

sensing the cut crop material and foreign hard objects using a sensor to generate a first signal;

amplifying the first signal, wherein a magnitude of amplification is controlled by a microprocessor;

processing the amplified signal to filter a bandwidth to generate a bandwidth filtered signal;

processing the bandwidth filtered signal to generate an amplitude thresholded signal when the bandwidth filtered signal exceeds a minimum threshold amplitude, wherein the microprocessor controls a value of the minimum threshold amplitude;

processing the amplitude thresholded signal to generate an internal signal only when the amplitude thresholded signal has a pulse train frequency value that falls within a specified bandwidth frequency range, thereby eliminating noise signals; and determining that a hard object is present based upon the internal signal, then removing the hard object using a hard object removal mechanism to produce a cut crop material that is essentially cut crop matter.

6. A method according to claim 5, further comprising the step of:

adjusting the removal of foreign hard objects from the cut crop material by controlling the magnitude of amplification of the first signal with the microprocessor.

7. A method according to claim 5, further comprising the step of:

adjusting the removal of foreign hard objects from the cut crop material by controlling the value of the minimum threshold amplitude used when processing of the bandwidth filtered signal, wherein the microprocessor controls the value of the minimum threshold amplitude.

\* \* \* \* \*